Jan. 16, 1968  R. D. HUNT  3,363,717
VEHICLES FOR TRAVELLING OVER A SURFACE AND EQUIPPED
WITH INFLATABLE CUSHION-RETAINING WALLS
Filed Nov. 17, 1964 5 Sheets-Sheet 1
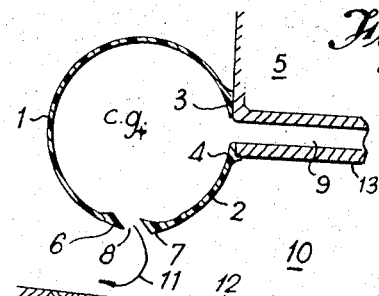
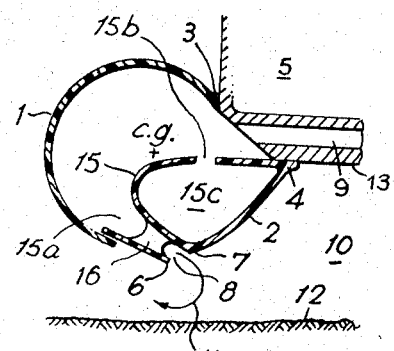
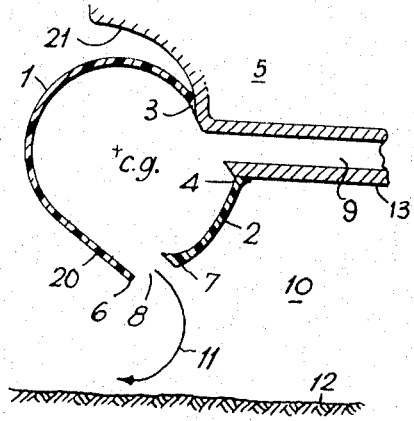
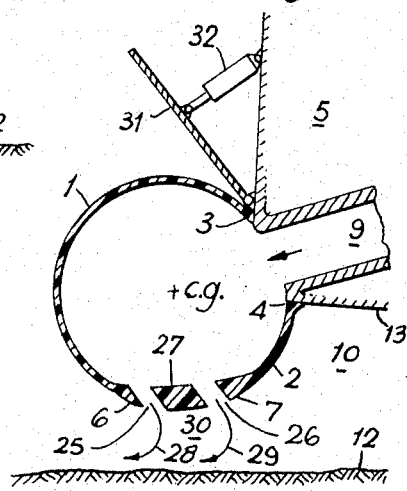
INVENTOR
R. D. HUNT
BY
Cameron, Kerkam & Sutton
ATTORNEYS

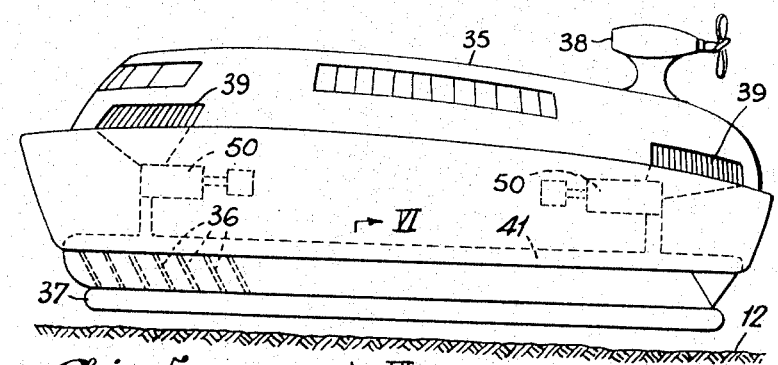
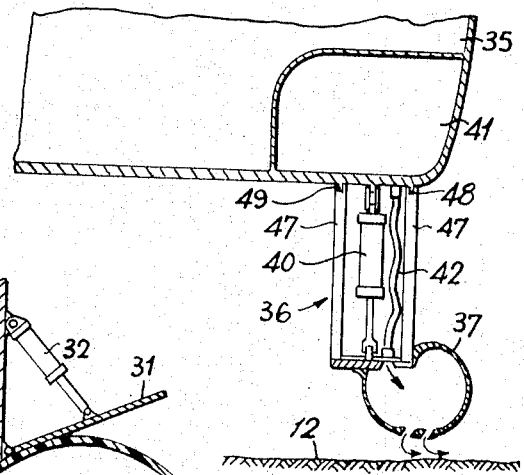
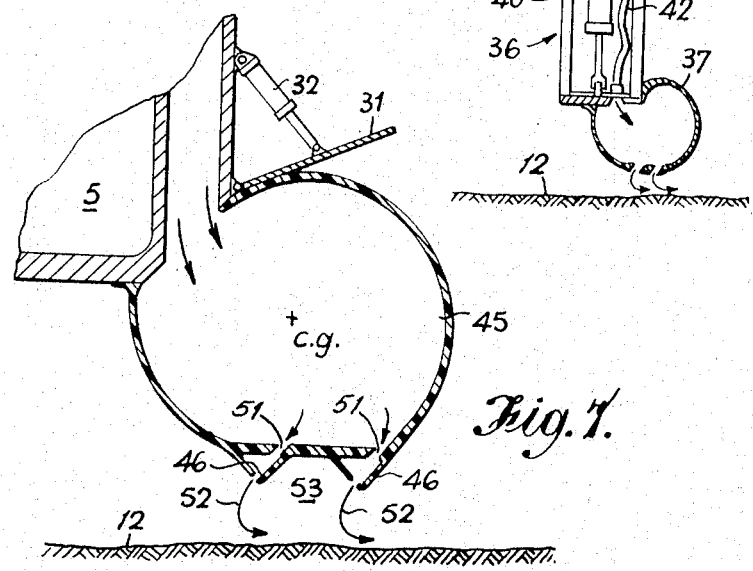

Jan. 16, 1968 R. D. HUNT 3,363,717
VEHICLES FOR TRAVELLING OVER A SURFACE AND EQUIPPED
WITH INFLATABLE CUSHION-RETAINING WALLS
Filed Nov. 17, 1964 5 Sheets-Sheet 3
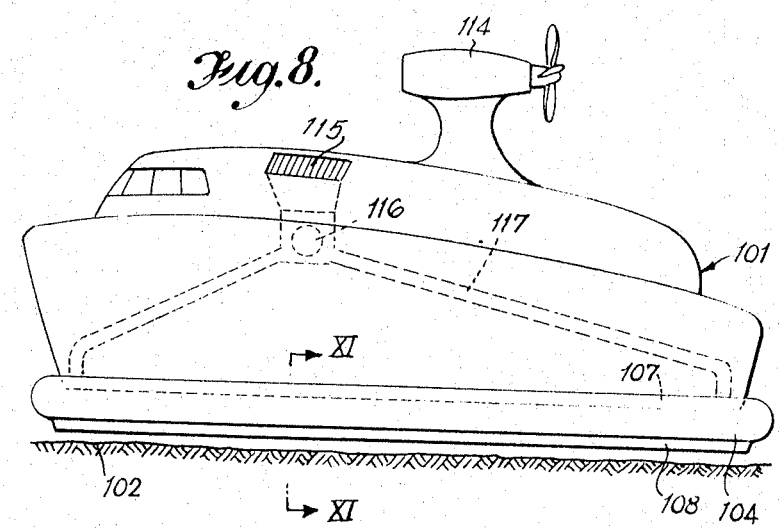
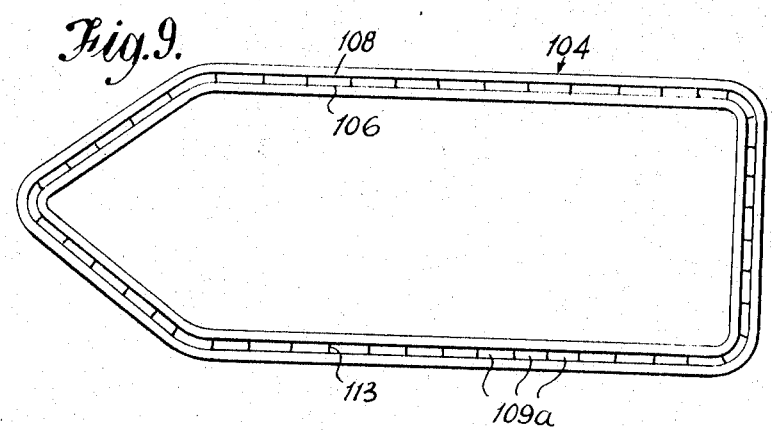
INVENTOR
R. D. HUNT
BY
Cameron, Kerkam & Sutton
ATTORNEYS

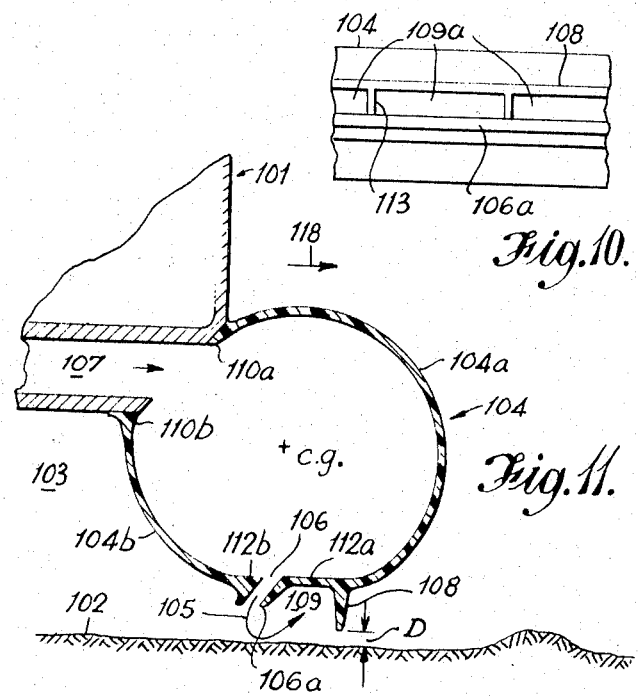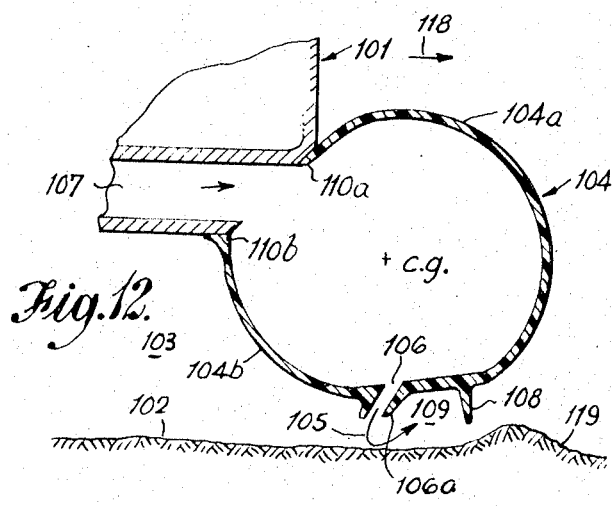

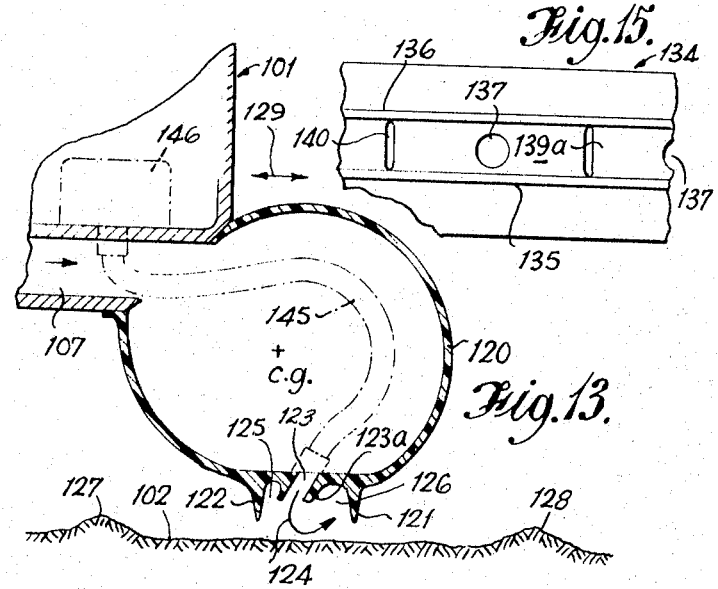
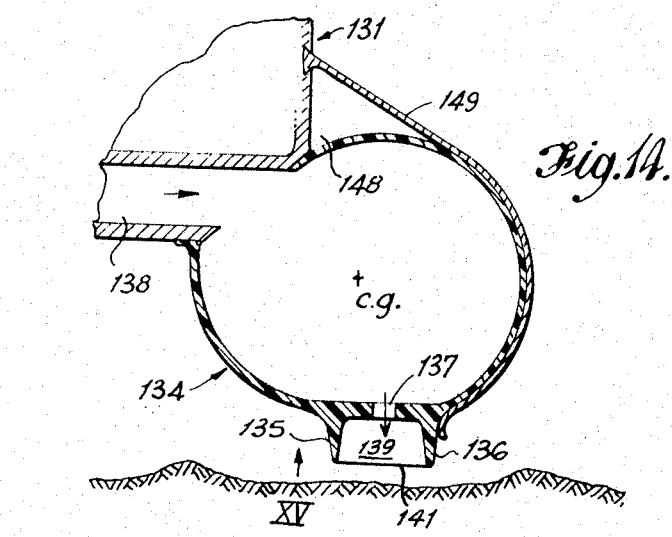

3,363,717
VEHICLES FOR TRAVELLING OVER A SURFACE AND EQUIPPED WITH INFLATABLE CUSHION-RETAINING WALLS

Rowland Delville Hunt, Cayuga, England, assignor to Hovercraft Development Limited, London, England, a British company
Filed Nov. 17, 1964, Ser. No. 413,397
Claims priority, application Great Britain, Nov. 18, 1963, 45,468/63; Apr. 3, 1964, 13,910/64
25 Claims. (Cl. 180—128)

This invention relates to vehicles for travelling over a surface and which, in operation, are supported above that surface by one or more cushions of pressurised gas formed and contained beneath the vehicle.

It has been proposed to attach flexible structures to the lower part of a vehicle to assist in containing the cushion, the structures normally having a clearing between them and the surface beneath and being subject to deflection by occasional contact with the surface over which the vehicle is travelling.

The flexible structures must be of a construction which will provide sufficient strength to contain the cushion. Hitherto, the structures have been constructed so that they are strong enough in themselves to contain the cushion pressure, in which case they inevitably have considerable resistance to deflection if contact with the surface or some obstacle occurs. This resistance to deflection creates drag forces and increases the possibility of damage. Alternatively, the structures make use of hoop or tensile stresses set up by the cushion pressure to resist or contain this pressure. In this latter case, while a structure will generally deflect quite readily inwards towards the cushion space, as at the front of a vehicle, it will not deflect very readily outwards, as at the rear, since the hoop or tensile stresses tend to oppose such a deflection. Severe damage is thus liable to occur to the structure and again drag forces are created.

A further disadvantage of known flexible structure is that deflection of a structure is usually accommodated by buckling or creasing of various parts of the structure. It will be appreciated that when a vehicle is operating over a rough surface, which is likely to be for most of the time, continual and rapid variations in deflection of the structure occur and this will lead to rapid deterioration of the materials of which the structure is formed.

The severity of the disadvantages of the structures referred to above increase with height. Many of the hitherto proposed structures are acceptable for small heights with the accompanying small deflections but there is then the disadvantage that the height of any irregularities which can be accommodated is also small.

The present invention is concerned with inflated structures which will deflect by flexing or slight bending of the material of which they are made. The structures according to the invention also have a cross-section normal to the periphery of the cushion, such that although the structure is normally clear of the surface, having a curtain of moving fluid formed beneath it, it will readily deflect irrespective of the direction from which an obstacle is met.

According to the invention there is provided a gas-cushion supported vehicle in which the cushion is contained for at least part of its periphery by an inflatable structure comprising an outer flexible part attached to the lower part of the vehicle body and extending from an upper edges outwardly away from the cushion space, then downward and inwardly to the outboard side of a port structure presented towards the surface beneath the vehicle, an inner flexible part extending from an upper edge outwardly and downwardly to the inboard side of the port structure, the centre of gravity of the cross-section of the inflatable structure, normal to the periphery of the cushion, being outboard of the position at which the upper edge of the outer flexible part is attached to the vehicle body, and means for supplying fluid to the interior of the inflatable structure to maintain inflation and to establish a through flow outwardly through the port structure.

The port structure may be a separate member positioned between the outer and inner flexible parts, or may be formed by lower edges of the flexible parts. In a further arrangement, the two flexible parts may be integral, the port structure then merely being ports cut in the lower part of the integral member.

In a particular form of the invention, the likelihood of contact between the inflatable structure and the surface is reduced by causing curtain-forming fluid to issue from two parallel ports provided by the port structure. A subsidiary pressurised cushion is then formed between the parallel curtains. If the clearance between the inflatable structure and the surface decreases, the pressure of the subsidiary cushion increases to deflect the structure upwards. Thus, according to a further feature of the invention there is provided an inflatable structure comprising an outer flexible part extending from an upper edge outwardly away from the cushion space, then downward and then inwardly to a lower edge, an inner flexible part extending from an upper edge outwardly and downwardly to a lower edge, and a port structure extending between the two lower edges, at least two parallel ports being formed in the port structure and extending parallel to the periphery of the cushion.

The port structure may be of rigid or stiff construction. Alternatively it may be of flexible construction, being normally in tension between the two lower edges of the flexible parts. Transverse ports may also be formed in the port structure to provide transverse curtains of moving fluid which sub-divide the subsidiary cushion and localise any pressure variations therein.

According to yet a further feature of the invention, the outer flexible part may deflect into contact with a shaped, and/or movable surface on the lower part of the vehicle body, as the inflatable structure is deflected upwards, the deflection characteristics of the inflatable structure being thus varied.

Inflatable structures according to the invention can readily be attached to lower parts of movable structures depending from the bottom of the vehicle body, so that the inflatable structures accommodate the smaller, more frequent, surface irregularities, and the structures accommodate (by movement) the larger, less frequent, irregularities. Movement of the movable structure can be controlled and/or initiated by power operated means.

The invention will be understood by the following description of certain embodiments in conjunction with the accompanying drawings, in which:

FIGURE 1 is a diagrammatic vertical cross-section through one form of inflatable structures according to the present invention, FIGURE 2 is a cross-section, similar to that of FIGURE 1, illustrating another form of structure, FIGURE 3 is another cross-section, similar to that of FIGURE 1, illustrating a further form of structure, FIGURE 4 is a further cross-section, similar to that of FIGURE 1, illustrating yet another form of structure, FIGURE 5 is a side view of a vehicle embodying the invention, FIGURE 6 is a cross-section on the line VI—VI of FIGURE 5, to a larger scale, FIGURE 7 is a cross-section similar to that of FIGURE 6 illustrating an alternative arrangement, FIGURE 8 is a side view of a vehicle incorporating another embodiment of the invention, FIGURE 9 is an inverted plan view of the vehicle of FIGURE 8, FIGURE 10 is an enlarged detail of FIGURE 9, FIGURE 11 is a side view, in section, on the lines XI—XI of FIGURE 8, FIGURE 12 illustrates the behaviour of the inflatable structure of FIGURE 11 when confronted with an obstacle, FIGURE 13 is a modification of the inflatable structure illustrated in FIGURE 11, FIGURE 14 is a side view illustrating yet a further embodiment of the invention, and FIGURE 15 is a detail of FIGURE 14, looking in the direction of the arrow XV of that figure.

The inflatable structure illustrated in FIGURE 1 comprises an outer flexible part 1 and an inner flexible part 2. The flexible parts 1, 2 are attached at their upper edges 3, 4, respectively to the periphery of the lower part of the body of the vehicle 5, the position of attachment of the outer part 1 being a short distance above that of the inner part 2.

The outer part 1 extends, relative to the cushion space 10 beneath the vehicle 5 outwardly then downwardly, finally extending inwardly to a lower edge 6. The inner part 2 extends downwardly and inwardly to a lower edge 7. The two lower edges 6 and 7 are spaced apart in a parallel disposition and co-operate to form a port structure 8. Air is supplied to the interior of the inflatable structure through a duct 9. The air inflates the structure and finally issues through the port 8. Once a cushion of pressurised air has been set up in the space 10, the air issuing from the port 8 is deflected round and out, in the form of a curtain 11. The centre of gravity, e.g. of the structure, normal to the periphery of the cushion space 10, is outboard of the points of attachment of the structure to the vehicle body.

The inner and outer flexible parts 1, 2 can be of any convenient construction, provided the structure as a whole can readily deflect up and down. The flexible parts are normally always in tension and can therefore be quite thin and light. A suitable material is cloth reinforced synthetic rubber or other flexible material. The inflatable structure serves to contain the cushion in the space 10 for the upper part of its periphery, the curtain 11 containing the lower or remaining part of the cushion periphery.

The geometry of the shape of the structure can readily be predetermined. The outer flexible part 1 has a pressure acting on the inside of the structure which is the pressure of the air supply through the duct 9, and normally atmospheric pressure acts on the outside. The flexible part 1 will therefore tend to form a circular arc. The inner part 2 has the pressure of the air supply through the duct 9, acting on the inside and a lower pressure, the cushion pressure, acting on the outside. The inner part will thus also tend to form a circular arc. Depending upon the lengths of the parts 1 and 2 from their upper edges 3 and 4 to their lower edges 6 and 7 respectively, so the radius of the two arcs formed will vary. To ensure that a required port shape is always provided, the lower edges 6 and 7 can be stiffened, and some means is provided such as ties or the like, for maintaining the two edges 6 and 7 at the correct disposition. For example the port structure 8 may be made as a separate stiff or semistiff grill attached to the edges 6 and 7.

The vehicle wil operate, during normal conditions, over a smooth surface 12, with a predetermined clearance between the bottom surface 13 of the vehicle 5, and the surface 12 beneath. There will thus also be a particular clearance between the bottom of the inflatable structure and the surface 12. If the surface 12 approaches more nearly to the bottom surface of the vehicle, the clearance between the bottom of the structure and the surface also decreases. This reduces the height to be closed by the curtain 11 enabling the curtain to contain higher cushion pressure in the space 10. This higher cushion pressure pivots the inflatable structure upwards about its points of attachment until it finds a new equilibrium position. At this equilibrium position, the clearance between the bottom of the structure and the surface will be somewhat less than normal as the deflection of the inflatable structure will deform it from its normal cross-section and there will be a restoring force tending to urge the inflatable structure down again, the restoring force being opposed by the increased cushion pressure.

Pivot or cantilever-like deflection of the inflatable member upwards from its points of attachment also causes the position of the port structure 8 and thus also the cushion periphery to be moved outwards in a direction away from the cushion centre. If the deflection occurs locally, as for instance when the vehicle 5 tilts, then the port 8 moves outwards at this locality, the periphery of the cushion also moving outwards at this locality. This has the effect of moving the centre of pressure of the cushion relative to the vertical axis through the centre of gravity of the vehicle 5, the movement being towards the locality at which deflection of the inflatable member has occurred. This movement will create an upward thrust on the vehicle 5 tending to lift the vehicle back to an even keel.

Reverse or downward deflection of the inflatable member will occur if an increase in clearance occurs. Similarly, local increases in clearance will result in movements of the centre of pressure of the cushion which will tend to offset or correct such local increases in clearance.

The inflatable structure will also readily deflect if contact occurs between the structure and the surface.

FIGURE 2 illustrates an alternative form of inflatable structure which, in addition to outer and inner flexible parts 1 and 2, as in FIGURE 1, also has a curved baffle member 15 disposed inside the structure, attached at its inner edge to the bottom of the vehicle 5, conveniently at the same position as that at which the upper edge 4 of the inner flexible part 2 is attached to the bottom of the vehicle. The member 15 extends first outwardly and then round and downwardly, being attached at its outer edge to the outer edge 7 of the inner flexible part 2. The lower part of the member 15 co-operates with the lower portion of the outer flexible part 1 to form a duct 15a terminating at the port 8, serving to guide through-flowing air in a predetermined inward direction. A series of webs 16 extend across the duct 15a to maintain the correct disposition of the various ports and members and more readily maintain the correct geometry of the port during deflection of the inflatable structure. The baffle member 15 has an aperture 15b which allows inflating air to enter the space 15c between the member 15 and the inner flexible part 2. By making the aperture 15b a flow restriction orifice, the space 15c can serve as a damping chamber to damp out tendencies of the inflatable structure to oscillate.

FIGURE 2 also illustrates a modification in the attachment of the inflatable structure of the vehcile. In FIGURE 1, the inflatable structure is attached to a vertical surface on the vehicle body, also at the periphery of the vehicle body. In FIGURE 2 the inflatable structure is attached to an inclined surface. While, for a given size of inflatable structure and vehicle body, attachment to a vertical surface as in FIGURE 1 gives a larger cushion area than when attached to an inclined surface as in FIGURE 2, attachment as in FIGURE 2 provides a greater clearance between the bottom surface of the vehicle and the surface 12. It also provides an arrangement wherein the inflatable structure is rather stiffer (for the same inflation pressure) than the arrangement of FIGURE 1. There is a great advantage, however, in attaching the inflatable structure to a vertical surface, or one which is not inclined at too great an angle to the vertical, in that the points of attachment of the flexible members 1 and 2 are accessible when the vehicle 5 is at rest on the surface 12 with no cushion 10 to support it. Normally, when at rest over a hard surface, such as when being serviced, the vehicle is supported clear of the surface, such as by wheels etc., but it is likely to be inconvenient to get under the vehicle to reach attachment positions which are on the bottom surface of the vehicle, inboard of the vehicle periphery. Thus the vertical/near vertical form of attachment has great advantages, particularly in "field" servicing.

FIGURE 3 illustrates a modification in the formation of the outer flexible member 1. The lower portion 20 of the outer flexible part 1 is of resilient material. This assists in preventing the port 8 being closed when the structure is deflected by contact between the lower portion 20 and the surface 12. A further modification illustrated in FIGURE 3 is the shaping of the lower peripheral part of the vehicle body above the inflatable structure, which is attached to the vehicle body adjacent its periphery. A shaped surface 21 is positioned above the inflatable structure, in the present instance being a concave curve. As the inflatable structure is deflected upwards, the upper portion of the outer flexible part 1 will progressively move into contact with the shaped surface 21, modifying the deflection characteristics of the inflatable structure. The shape of the surface 21 can vary, and may be on a separate member attached to the periphery of the vehicle. The shaped surface can also be movable relative to the vehicle body, as described below with respect to FIGURE 4.

The examples so far described have been of the form in which small or slow variations in clearance cause deflection of the inflatable structure as a result of variations in pressure within the cushion space 10, whilst large and rapid variations cause deflection by contact between the structure and the surface, assisted by any variation in cushion pressure. FIGURE 4 illustrates an arrangement in which a subsidiary cushion of pressurised gas is formed beneath the inflatable structure, deflection of the structure being caused by variation in the pressure of the subsidiary cushion, assisted by any variation in pressure of the main support cushion. Deflection by contact with the surface now only occurs in extreme conditions and therefore the possibility of damage is reduced. Furthermore, where the vehicle 5 operates over water, wave drag is substantially reduced. This arrangement is particularly sensitive to local obstacles.

The construction of the inflatable structure illustrated in FIGURE 4 is similar to that of FIGURES 1 to 3. It comprises outer and inner flexible parts 1 and 2 attached at their upper edges 3 and 4 to the lower part of the vehicle 5. Air is supplied to the interior of the structure through duct 9, and a vehicle-supporting cushion of pressurized air is built up in the cushion space 10. However, instead of the lower edges 6 and 7 of the flexible parts 1 and 2 cooperating to form a single port structure, two parallel ports 25 and 26 are formed in a port structure 27 positioned between the outboard and inboard edges 6 and 7. Air issues from the two ports 25 and 26 to form two parallel, spaced-apart curtains 28 and 29. A subsidiary cushion of pressurised air is formed in the space 30 between the two curtains.

The construction of the port structure 27 can vary. In its simplest form it may be a thin flat strip of material positioned between and spaced from the edges 6 and 7 and cooperating with these edges to form the ports 25 and 26. Ties or webs will be required to maintain the correct disposition of the edges and the base member. Alternatively, the ports may be formed in a port structure which is then attached in edge to edge contact with the lower edges 6 and 7 of the flexible parts 1 and 2. The port structure may be of rigid or flexible construction.

A reduction in clearance between the bottom of the vehicle 5 and the surface 12, and thus a reduction in clearance between the bottom of the inflatable structure and the surface 12, produces an increase in pressure of the subsidiary cushion in the space 30. This pressure increase deflects the inflatable structure upwards, the ports 25 and 26 then moving outwards. If the movement of the ports 25 and 26 and thus also of the cushion 10 periphery, occurs all round the vehicle in a symmetrical manner, then an upward thrust (due to the increase in cushion area) is applied to the vehicle 5. To achieve a reasonable degree of cushion area increase, the inflatable structure will have to be constructed so as to be extendable lengthwise. This can be provided for by making the inflatable structure of corrugated form. If the deflection is local then the periphery of the main supporting cushion in the space 10 moves locally, causing movement of the centre of pressure of the cushion.

Further, transverse, ports can also be formed in the port structure 27, extending between the ports 25 and 26 in directions normal to the periphery of the cushion space 10. Transverse curtains of air are formed by air flowing outwardly from the transverse ports and these curtains subdivide the subsidiary cushion, thus serving to localise any variation in subsidiary cushion pressure which occurs as a result of a local variation in clearance between the inflatable structure and the surface 12.

As illustrated in FIGURE 4, a movable surface 31 may be positioned above the outer flexible member 1 to provide adjustable stop means to limit upward travel of the inflatable structure. The angular position of the movable surface is varied by a hydraulic jack 32 or a similar actuating device. As the inflatable structure deflects up and down, so the flexible part 1 moves progressively into and out of contact with the movable surface 31, varying the deflection characteristics of the inflatable structure. By varying the angle of the movable surface 31, the deflection characteristics of the inflatable structure can be varied further, in a controlled manner.

Further, it is possible to vary the position of the movable surface 31 to provide stablising forces on the vehicle. Thus, by moving the surface 31 downward the load required to deflect the inflatable structure will be increased. This will result in a reduction in height of the curtains 28 and 29, so that they can support an increased subsidiary cushion pressure in the space 30 and also resulting in an increasing pressure of the vehicle-supporting cushion in the space 10. In the space 10 is subdivided by any means, this pressure increase will be localised and will provide a force tending to tilt the vehicle upwards at the locality of increased pressure. Such an upward thrust can be provided at any desired locality, or for the whole of the area of the bottom of the vehicle, to improve the stability of the vehicle in roll, pitch or heave. Reverse operation of the movable surface 31, i.e. upwards, will result in a decrease in the pressure of the vehicle-supporting cushion in the space 10. The actuation of the jack 32 can be under the direction control of the driver of the vehicle, who can thereby trim the vehicle, or alternatively or in addition, may be actuated automatically be a control device responsive to variations in trim or in the clearance between the lower part of the vehicle 5 and the surface 12, or responsive to vertical accelerations or any other suitable parameter, such as the device illustrated in FIG. 8 of Patent No. 3,272,271.

Inflatable structure according to the invention can readily be attached to the lower parts of structure which depend below the bottom of the main body of a vehicle and movably attached thereto, forming a two-stage or two-part system. FIGURE 5 illustrates, diagrammatically a vehicle 35. Depending below the bottom of the vehicle and extending around the periphery thereof is a movable structure formed by a series of flexibly attached members 36. Attached to the lower parts of the members 36 is an inflatable structure 37 according to the invention. The vehicle 35 is propelled over the surface 12 by one or more airscrew propulsion units 33. Air is supplied to the inflatable structure 37 from intakes 39 via compressors 50 and supply ducts 41 disposed within the vehicle. The arrangement of the flexibly attached members 36 and the inflatable structure 37 can be more easily seen in FIGURE 6, which is a cross-section on the line VI—VI of FIGURE 5, to a larger scale.

In the example illustrated, the flexibly attached members 36 comprise a series of frames 47 pivotally attached at 48, 49, to the bottom of the vehicle 35. The members 36 are spaced apart and inclined rearwardly, as can be seen by the dotted lines in FIGURE 5. The members 36 are moved, i.e., raised or lowered by hydraulic (or pneumatic) jacks 40. Attached to the lower part of the members 36 is the inflatable structure 37 which is generally of the form illustrated in FIGURE 4. Air is fed to the inflatable structure from the compressors 50 through the ducts 41 and flexible pipes 42. The movement of the members 36, up and down, can be controlled automatically, for example, the jacks 40 can be controlled by means responsive to variations in pressure the vehicle-supporting cushion space 10, variations in pressure the subsidiary cushion space 30, or any other parameter variation of which is indicative of a variation in the clearance between the bottom of the vehicle 35 and the surface 12, such as the means illustrated in FIG. 16 of Patent No. 3,182,739. The control means can be arranged to respond to large variation and to disregard small variations of the particular parameter chosen.

It will be appreciated that the particular example of flexibly attached member 36 described is by way of example only and many other forms of movable structure can be used. The means for moving such structure can also be varied.

An alternative form of a two-stage system can be provided by using flexible structure according to the invention as the upper stage and attaching other forms of movable structures below the flexible structure. As explained above, many of the hitherto proposed structures are acceptable where only small deflections are required. For example, as illustrated in FIGURE 7, the upper stage of a two-stage system can comprise an inflated structure 45 of the form illustrated in FIGURE 4, with two parallel convoluted or segmented flexible skirts 46 attached to the bottom of the inflated structure 45 to form the lower stage. The bottom of the structure 45 has parallel port structures 51 through which inflating air passes to the skirts 46 to issue from the bottoms of the skirts as air curtains 52. A subsidiary cushion of air is formed in the space 53 between the curtains 52. The skirts 46 form flexible extensions of the port structures 51 and accommodate small irregularities on the surface 12. Larger surface irregularities are accommodated by deflection of the inflated structure 45. Typical examples of a segmented skirt are illustrated and described in co-pending and co-owned application Ser. No. 267,695, filed March 25, 1963, now abandoned, and Ser. No. 566,948, filed July 21, 1966.

Referring to FIGURES 8 to 11, and particularly to FIGURE 11, a vehicle 101 is supported above a surface 102 by a cushion 103 of air formed and contained beneath the vehicle 101, the cushion 103 being contained at its periphery by the combination of an inflatable structure 104 and a curtain 105 of moving air, the curtain 105 being provided by outflow of surplus inflating air through a port structure 106 formed in the base of the structure 104. The inflating air is supplied to the interior of the structure 104 by way of a duct 107. The part structure 106 is provided with a nozzle extension 106a which directs air forming the curtain 10 inwardly towards the cushion 103. The structure 104 has a wall member 108 depending from the base of the structure 104, so as to bound a space beneath the port 106. Air from the curtain 105 forms in the space a cushion 109 supporting the structure 104 above the surface 102.

In further detail, the inflatable structure 104 is of annular form and comprises an outer flexible part 104a and an inner flexible part 104b. The flexible parts 104a, 104b are attached at their upper edges to anchorages 110a, 110b, at the periphery of the vehicle 101, the anchorage 110a being slightly higher than the anchorage 110b. The air cushion 109 is sub-divided into a plurality of cushion cells 109a (FIGURES 9 and 10) by traversing air curtains formed by surplus inflating air issuing through slots 113 in the base of the inflatable structure 104.

The flexible part 104 has a cross-sectional profile normal to the periphery of the cushion 103 which extends outwardly, then downwardly, finally extending inwardly to a lower edge 112a. The flexible part 104b has a cross-sectional profile which extends downwardly and outwardly to a lower edge 112b. The lower edges 112a, 112b are spaced apart in a parallel disposition and cooperate to form the port 106, which, like the flexible structure 104, is of annular form. The centre of gravity, e.g. of the cross-section of the structure 104, normal to the periphery of the cushion 103, is outboard of the anchorage 110a.

The vehicle 101 is propelled over the surface 102 by an airscrew engine unit 114 (FIGURE 9 only). Atmospheric air is drawn through intakes 115 by a compressor 116 carried by the vehicle 101 and, after pressurisation, is supplied to the ducts 107 by way of tappings 117 so as to inflate the structure 104. Both during and after inflation of the structure 104 air issues through the port structure 106 to establish the cushion 103. Once the cushion 103 has been established, air issuing from the port structure 106 is deflected round and out by cushion pressure to form the curtain 105.

Pressure within the inflatable structure 104 is greater than either atmospheric pressure or the pressure of the cushion 103. The structure 104, is therefore, normally subjected to wholly tensile loading and can be constructed of thin and light material, for example, cloth reinforced by synthetic rubber.

The wall member 108 associated with the inflatable structure 104 is formed from rubber strip, the upper edge of the strip being cemented to the base of the structure 104. The wall member 108 is spaced parallel to the port structure 106 and its lower edge is, under normal condition, spaced from the surface 102 by a distance D. The distance D represents an equilibrium condition with the cushion 109, the cushion being supplied with air at the same rate as it loses it to atmosphere through the gap between the wall member 108 and the surface 102.

If the vehicle 101 is moved in the direction of the arrow 118, that is, so that the inflatable structure 104 of the figure is moved towards an obstacle 119 on the surface 102, as the distance D is decreased the pressure of the cushion 109 rapidly builds up to cause an immediate upward pivoting of the structure 104 about its points of attachment to the vehicle 101. This upward deflection continues until the inflatable structure 104 finds a new equilibrium condition, as illustrated in FIGURE 12. The new equilibrium condition actually results in a clearance less than the distance D of FIGURE 11, as the deflection of the inflatable structure 104 from its original position will deform its cross-section so that a restoring force is created as the structure 104 attempts to return to its normal cross-section.

Local increases in clearance between the wall member 108 and surface 102 will also result in movements of the centre of pressure of the cushion 103 which movements will tend to offset said local increases.

In the modification illustrated in FIGURE 13 the vehicle 101 is provided with an inflatable structure 120 of similar outline to the structure 104 of FIGURE 11. Two wall members 121, 122 depend from the base of the inflatable structure 120 and are disposed in spaced relation on each side of a central, annular port structure 123 penetrating the base of the structure 120. The port structure 123 has a nozzle extension 123a. The wall members 121, 122 cooperate with a fluid curtain 124 in forming two cushions 125, 126 supporting the structure 120 above the surface 102. The curtain 124, which separates the cushions 125, 126, is formed by surplus inflating air supplied to the interior of the inflatable structure 120 by way of the duct 107.

The inflatable structure 120 can deflect by pivot movement to avoid obstacles (such as the obstacles 127, 128) when moving either to the right or left of FIGURE 10, as indicated by the arrow 129.

In the embodiment illustrated in FIGURES 14 and 15, a vehicle 131 is provided with an inflatable structure 134 of form similar to the inflatable structure 120 of FIGURE 13 but supported by an air cushion 139 retained in a plenum chamber defined by two wall members 135, 136. The wall members 135, 136 depend from the base of the inflatable structure 134 and are disposed in spaced relation on each side of a port structure in the form of a central ring of ports 137 formed in the base of the structure 134. Inflating air is supplied to the interior of the inflatable structure 134 by way of a duct 138 and the annual space between the wall members 135, 136 is filled with surplus inflating air outflowing through the ring of ports 137 and forms the plenum chamber which contains the air cushion 139. The cushion 139 supports the inflatable structure 134 above the surface 102. The cushion 139 is sub-divided (see FIGURE 15) into a plurality of cushion cells 139a by traversing air curtains formed by surplus inflating air issuing through transverse slots 140 in the base of the inflatable structure 134. Alternatively, the traversing air curtains could be replaced (as the traversing air curtains of the previously described arrangements could also be replaced) by crossmembers 141 of flexible material (see FIGURE 14).

Inflatable structures according to the invention will also readily deflect downwards to maintain its clearance from the surface 102 when confronted with a depression in that surface.

Modifications of the invention include sub-division of a flexible structure-supporting air cushion (such as the air cushion 109) by flap members of flexible material instead of by use of air curtains; use of flexible wall members formed from thin sheet material (such as disclosed by the above mentioned co-pending applications Serial Nos. 267,695 and 566,948 instead of any of the wall members 108, 121, 135, 136; and use of a vehicle-cushion centre of pressure varying arrangement such as disclosed by co-pending application Serial No. 316,852, filed Oct. 17, 1963, now Patent No. 3,291,237.

In modifications of any of the above described arrangements, the fluid outflowing through the port structure in the base of an inflatable structure can be segregated from the fluid maintaining inflation of the inflatable structure. For example, with reference to FIGURE 13, by providing an internal flexible duct 145 connecting the port structure 123 with a source 146 of pressurised fluid separate from the inflation fluid flowing through the duct 107.

With reference to FIGURE 14, in further modifications of any above described arrangement (or modification thereof) a vehicle intended for operation over water can be provided with means whereby water spray is prevented from collecting in the space 148 between the vehicle body and an inflatable structure. Said means can comprise, as illustrated, a flexible membrane 149 interconnecting the vehicle body 131 and inflatable structure 134 to close-off the space 148. Preferably, as shown the membrane 149 extends downwardly over the outer surface of the inflatable structure 134 to provide an outer skin to protect the wall of the structure 134 from damage. The membrane 149 is bonded to the outer surface of the inflatable structure 134.

Inflatable structures according to the invention are further characterised by the relatively small distance between their points of attachment. This dimension is substantially smaller than the cross-sectional periphery of the structure as will be readily appreciated by examination of the accompanying figures. This characteristic results in an inflatable structure which is not unduly "stiff" in responding to deflection.

I claim:

1. A vehicle for travelling over a surface and which, in operation, is supported above said surface by at least one cushion of pressurised gas formed in a space beneath the vehicle body, including an inflatable wall structure for containing the cushion along at least part of its periphery, said inflatable wall structure comprising an outer flexible part attached to the vehicle body and extending downwardly therefrom and outwardly away from the cushion space, then downwardly and inwardly to present a substantially concave surface towards the cushion space, an inner flexible part extending outwardly and downwardly from the vehicle body to present a substantially convex surface towards the cushion space, a port structure between the lower portions of said inner and outer flexible parts presented towards the surface beneath the vehicle, the centre of gravity of the cross-section of the inflatable wall structure, normal to the periphery of the cushion, being outboard of the position at which the outer flexible part is attached to the vehicle body, the relationship between the inflatable wall structure and the vehicle body being such that at least part of the inflatable wall structure is free to move in an upward direction, and means for supplying pressurised fluid to the interior of the inflatable wall structure at a pressure greater than the pressure of said cushion to maintain inflation of said structure and to establish a through-flow of fluid outwardly through the port structure.

2. A vehicle as claimed in claim 1 wherein the inflatable wall structure is disposed inboard of the periphery of the vehicle body, and at least that part of the vehicle body which is above the inflatable wall structure is shaped to accommodate upward movement of said structure.

3. A vehicle as claimed in claim 1 wherein adjustable stop means are provided to vary the degree of upward movement of the inflatable wall structure.

4. A vehicle as claimed in claim 1 wherein the inflatable wall structure is provided with internal baffle means spaced from and defining with part of said structure, an internal duct terminating at said port structure and serving to guide the through-flowing fluid in a predetermined direction.

5. A vehicle as claimed in claim 4 wherein the space between the baffle means and the inflatable wall structure defines a chamber, and including chamber vent means to restrict flow of fluid from said chamber so that the chamber functions as a damping chamber to restrict oscillating movements of the inflatable wall structure.

6. A vehicle as claimed in claim 1 wherein the inflatable wall structure is provided with at least one flexible external extension of the port structure.

7. A vehicle as claimed in claim 1 wherein the port structure defines two parallel, spaced ports from which the through-flowing fluid issues in the form of two spaced, parallel curtains.

8. A vehicle as claimed in claim 1 including an intermediate structure through which the inflatable wall structure is attached to the vehicle body.

9. A vehicle as claimed in claim 8 including means for allowing the intermediate structure to accommodate movement of the inflatable wall structure in a substantially vertical direction.

10. A vehicle as claimed in claim 1 wherein the inflatable wall structure is provided with a least one wall member depending from its base so as to constitute, at least in part, means for containing a subsidiary cushion which is formed by fluid flowing through the port structure and serves to support the inflatable wall structure.

11. A vehicle as claimed in claim 10 wherein the wall member is disposed on the outboard side of the port structure of the inflatable wall structure and substantially parallel to the periphery of the vehicle-supporting cushion.

12. A vehicle as claimed in claim 10 wherein the wall member is disposed on the inboard side of the port structure of the inflatable wall structure and substantially parallel to the periphery of the vehicle-supporting cushion.

13. A vehicle as claimed in claim 10 wherein the wall member is of flexible material.

14. A vehicle as claimed in claim 1 wherein the inflatable wall structure is provided with two wall members depending from its base, one on each side of the port structure and disposed substantially parallel to the periphery of vehicle-supporting cushion, said wall members constituting means for containing a subsidiary cushion which is formed by fluid flowing through the port structure and serves to support the inflatable wall structure.

15. A vehicle as claimed in claim 14 wherein subsidiary cushion dividing means are provided to divide the space between the two wall members into a plurality of subsidiary cushion cells.

16. A vehicle as claimed in claim 15 wherein said subsidiary cushion dividing means comprise further ports in the base of the inflatable wall structure, from which ports fluid supplied to the interior of said structure issues to form fluid curtains which divide said space.

17. A vehicle as claimed in claim 15 wherein said subsidiary cushion dividing means comprise partition members.

18. A vehicle according to claim 17 wherein the partition members and the wall members are of flexible material.

19. A vehicle according to claim 14 wherein the wall members are of flexible material.

20. A vehicle according to claim 1 including shielding means operative, when operating over water, for preventing water spray from entering the space defined by the outer, upper, surface of the inflatable wall member and adjacent parts of the vehicle body.

21. A vehicle as claimed in claim 20 wherein said shielding means comprise a flexible membrane enclosing, with said parts of the vehicle body and said surface of the inflatable wall member, said space.

22. A vehicle as claimed in claim 21 wherein said membrane extends downwardly over the outer surface of the inflatable wall structure towards the bottom thereof and is attached to said outer surface.

23. A vehicle for travelling over a surface and which, in operation, is supported above said surface by at least one cushion of pressurised gas formed in a space beneath the vehicle body, including an inflatable wall structure for containing the cushion along at least part of its periphery, said inflatable wall structure comprising an outer flexible part attached to the vehicle body and extending downwardly therefrom and outwardly away from the cushion space, then downwardly and inwardly to present a substantially concave surface towards the cushion space, an inner flexible part extending outwardly and downwardly from the vehicle body to present a substantially convex surface towards the cushion space, a port structure between the lower portions of said inner and outer flexible parts presented towards the surface beneath the vehicle, the centre of gravity of the cross-section of the inflatable wall structure, normal to the periphery of the cushion, being outboard of the position at which the outer flexible part is attached to the vehicle body, the relationship between the inflatable wall structure and the vehicle body being such that at least part of the inflatable wall structure is free to move in an upward direction, means for supplying pressurised fluid to the interior of the inflatable wall structure at a pressure greater than the pressure of said cushion to maintain inflation of said structure, and means additional to said last named means for supplying pressurised fluid to flow outwardly through the port structure.

24. A vehicle for travelling over a surface and which, in operation, is supported above said surface by at least one cushion of pressurised gas formed in a space beneath the vehicle body, including an inflatable wall structure for containing the cushion along at least part of its periphery, said inflatable wall structure comprising an outer flexible part attached to the vehicle body and extending downwardly therefrom and outwardly away from the cushion space, then downwardly and inwardly to present a substantially concave surface towards the cushion space, an inner flexible part extending outwardly and downwardly from the vehicle body to present a substantially convex surface towards the cushion space, fluid outlet means between the lower portions of said inner and outer flexible parts, the centre of gravity of the cross-section of the inflatable wall structure, normal to the periphery of the cushion, being outboard of the position at which the outer flexible part is attached to the vehicle body, the relationship between the inflatable wall structure and the vehicle body being such that at least part of the inflatable wall structure is free to move in an upward direction, and means for supplying pressurised fluid to the interior of the inflatable wall structure at a pressure greater than the pressure of said cushion so as to maintain inflation of said structure and to establish a through-flow of fluid outwardly through said port structure.

25. A vehicle as claimed in claim 24 including means for containing fluid issuing from said fluid outlet means so as to form a subsidiary cushion between the bottom of the inflatable wall structure and the surface beneath the vehicle.

References Cited
UNITED STATES PATENTS

| | | | |
|---|---|---|---|
| 3,182,740 | 5/1965 | Cockerell | 180—7 |
| 3,232,366 | 2/1966 | Cockerell | 180—7 |
| 3,273,663 | 9/1966 | Cockerell | 180—7 |

FOREIGN PATENTS

| | | |
|---|---|---|
| 1,003,772 | 9/1965 | Great Britain. |

A. HARRY LEVY, *Primary Examiner.*